United States Patent [19]

Saito et al.

[11] Patent Number: 4,551,777
[45] Date of Patent: Nov. 5, 1985

[54] TRACKING SERVO SYSTEM FOR MAGNETIC RECORDING AND REPRODUCING APPARATUS USING FLEXIBLE MAGNETIC DISK

[75] Inventors: Tadashi Saito; Shigemitsu Higuchi, both of Yokohama; Kazutoshi Konno, Yokosuka; Tohru Sampei, Kanagawa; Kenji Hayashi, Kamakura; Yoshihiko Noro; Manabu Wakabayashi, both of Yokohama, all of Japan

[73] Assignee: Hitachi, Ltd., Tokyo, Japan

[21] Appl. No.: 407,080

[22] Filed: Aug. 11, 1982

[30] Foreign Application Priority Data

Aug. 24, 1981 [JP] Japan .................... 56-131501

[51] Int. Cl.⁴ .................... G11B 21/10; G11B 5/27
[52] U.S. Cl. .................... 360/77; 360/121; 360/78
[58] Field of Search .................... 360/77, 78, 121

[56] References Cited

U.S. PATENT DOCUMENTS

| | | | |
|---|---|---|---|
| 3,263,031 | 7/1966 | Welsh | 360/77 |
| 3,292,168 | 12/1966 | Gray | 360/77 |
| 3,491,347 | 1/1970 | Farrand | 360/77 |
| 4,056,832 | 11/1977 | de Boer et al. | 360/77 |
| 4,149,198 | 4/1979 | Behr et al. | 360/77 |
| 4,164,781 | 8/1979 | Brown | 360/77 |
| 4,297,733 | 10/1981 | Sanderson | 360/77 |

FOREIGN PATENT DOCUMENTS

| | | | |
|---|---|---|---|
| 49-84208 | 8/1974 | Japan . | |
| 55-64622 | 5/1980 | Japan | 360/121 |

Primary Examiner—Raymond F. Cardillo, Jr.
Assistant Examiner—Steven R. Garland
Attorney, Agent, or Firm—Antonelli, Terry & Wands

[57] ABSTRACT

A tracking servo system for a magnetic recording and reproducing apparatus uses a flexible magnetic disk having thereon at least first, second and third tracks each of which includes a data track portion and a pair of servo track portions located on both sides of the data track portion. Tracking signals having different frequencies are recorded on the first, second and third servo track pairs. Servo and data heads are formed in a unitary structure. When the data head records an information signal on the second data track portion or reads out the recorded information signal therefrom, the servo head reads out the tracking signals recorded on the first and third servo track portions.

5 Claims, 12 Drawing Figures

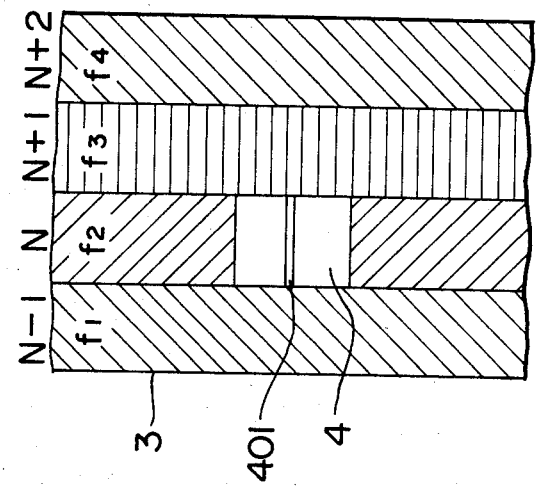
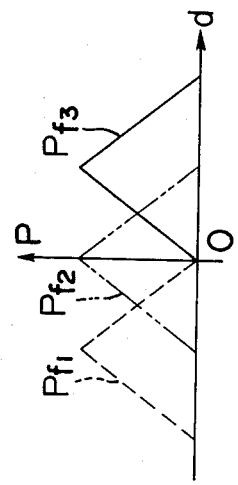
FIG. 1a PRIOR ART
FIG. 1b PRIOR ART
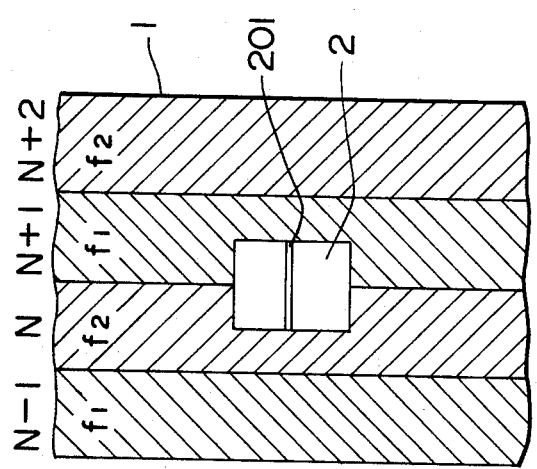
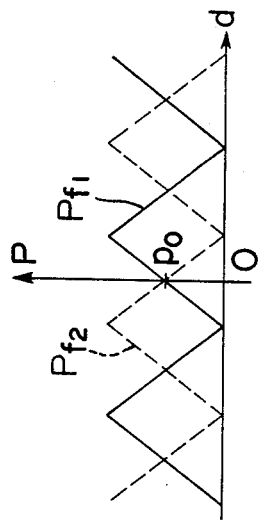
FIG. 2a PRIOR ART
FIG. 2b PRIOR ART

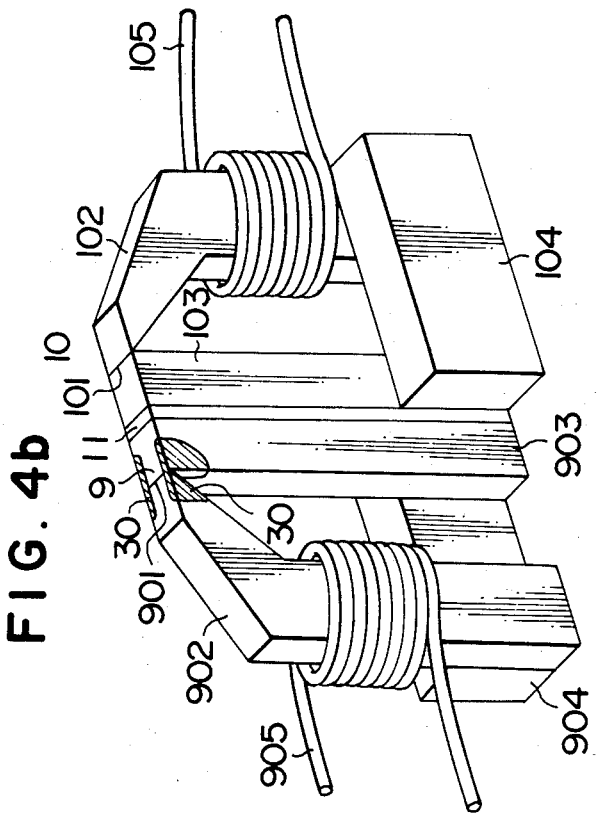
FIG. 4a
FIG. 4b
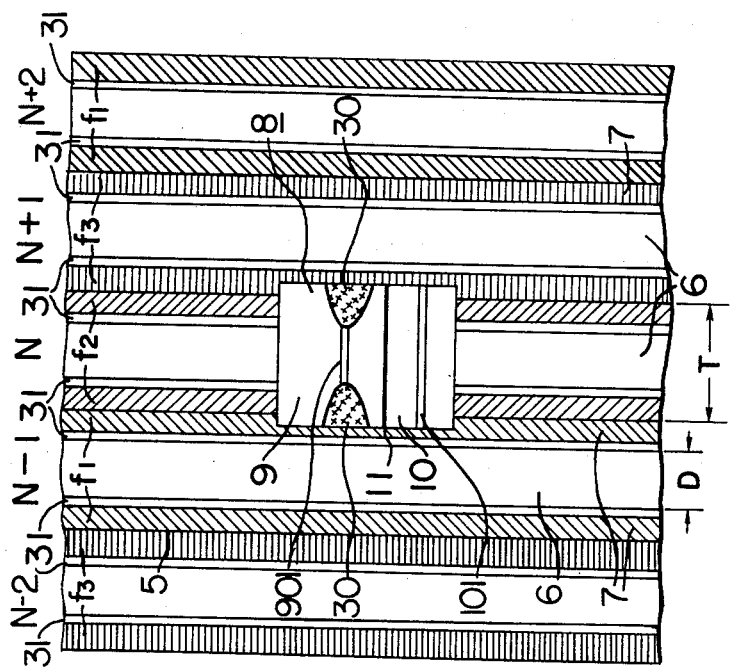
FIG. 3

TRACKING SERVO SYSTEM FOR MAGNETIC RECORDING AND REPRODUCING APPARATUS USING FLEXIBLE MAGNETIC DISK

BACKGROUND OF THE INVENTION

The present invention relates to a tracking servo system for a magnetic recording and reproducing apparatus using a flexible magnetic disk.

The magnetic recording and reproducing apparatus using a flexible magnetic disk, i.e. a flexible disk unit has features of low cost, small size and easy maintenance as compared with an interchangeable or fixed disk unit using a hard or rigid magnetic disk, and also has the advantages of short access time and random access capability over a magnetic tape memory unit such as a cassette tape. Therefore, the flexible disk drive unit has been widely used as a simple external storage in minicomputer and microcomputer systems.

The fixed disk unit using a hard magnetic disk generally employs a tracking servo system, and the recording track width or track pitch on the magnetic disk is chosen to be small in order to obtain a large track density and thereby to increase the storage capacity. On the other hand, in the conventional flexible disk drive unit, since the flexible magnetic disk intrinsically involves a large eccentricity of the track and a large variation in track diameter, a tracking servo system will not successfully respond. In fact, most of the conventional flexible disk drive units employ no tracking servo system because they have been developed under the requirements of low cost. Therefore, the conventional flexible disk drive unit has a relatively small storage capacity. However, the processing ability of microcomputers or the like is dramatically advancing owing to the progress of semiconductor technologies, and the flexible disk drive unit is now requested to have an increased storage capacity.

In the conventional tracking servo system for the fixed disk unit using a hard magnetic disk, one entire surface of a disk or a plurality of disks secured on the same axis is used exclusively for a tracking servo. FIG. 1a shows the pattern of servo tracks used in such a conventional tracking servo system. As shown in the figure, the disk surface used for tracking servo has the records of servo tracking signals $f_1$ and $f_2$ arranged alternately to form servo tracks. With the center of a gap 201 of a servo magnetic head 2 being located at the boundary of tracks N and N+1, the head 2 reproduces the signals $f_1$ and $f_2$ in the same amplitude $P_0$, as is apparent from FIG. 1b. If the servo head 2 moves toward the track N+1, the amplitude $Pf_1$ of the reproduced tracking signal $f_1$ increases while the amplitude $Pf_2$ of the reproduced tracking signal $f_2$ decreases. Conversely, if the servo head 2 moves toward the track N, the amplitude $Pf_2$ of the signal $f_2$ increases while the amplitude $Pf_1$ of the signal $f_1$ decreases. The reproduced tracking signals $f_1$ and $f_2$ are separated using a band-pass filter means or the like, and the servo head 2 is moved in accordance with a difference in amplitudes between the separated signals $f_1$ and $f_2$ so that the servo head 2 follows the boundary of the tracks N and N+1. Data is recorded on a disk surface different from the disk surface used for the tracking servo by means of a data head which moves in interlocking relation with the servo head 2. The servo head 2 is used solely for reading out the tracking signals $f_1$ and $f_2$ which have been recorded in the manufacturing process of the disk. The recorded signals are not erased or rewritten in usual cases.

The flexible magnetic disk is formed of a disk-shaped Mylar sheet with a magnetic medium coated on each of both surfaces thereof, and the sheet is enclosed in a soft case about 1 mm thick. If one surface of the disk is used exclusively for tracking servo, only the other surface is available for recording data, resulting in a poor efficiency of utilization. Unlike the fixed disk, the flexible disk detachable from the recording and reproducing apparatus and having exposed magnetic surfaces has the risk of demagnetization of the recorded tracking signals due to erroneous handling operation. Therefore, it is preferable that the tracking signals can be easily or freely rewritten. Accordingly, the conventional tracking servo system explained in conjunction with FIG. 1a is not suited for use in the recording and reproducing apparatus using a flexible disk.

There is known a system in which both data and servo tracking signals are recorded on the same magnetic surface of a magnetic disk in such a manner that each data track is divided into several sectors and a tracking signal is recorded between the sectors. However, in the case of the flexible magnetic disk, the number of sectors for each track is generally small and varies significantly depending on a data format used. For example, the standard 8-inch diameter flexible disk can have any of 8, 15 and 26 sectors. Therefore, this system is also unsuited for use in the recording and reproducing apparatus using a flexible disk unit.

There is also known, a system in which both data or the like and tracking signals are recorded on the same track in superimposed fashion. This system is employed in video tape recorders for home use and it is disclosed in detail in U.S. Pat. No. 4,297,733. This system will now be described with reference to FIGS. 2a and 2b FIG. 2a shows a magnetic surface of a magnetic tape in which superimposed video and tracking signals are recorded without any guard band. The video signal is azimuthally recorded so that the video signal recorded on a given track is protected from interference by signals recorded on the adjacent tracks. A magnetic head 4 used for both recording and reproducing operates to record the video and tracking signals in superimposed fashion on the magnetic tape and to reproduce the signals therefrom. The tracking signal is selected to have a frequency band which is sufficiently separate from that of the video signal, and these signals are separated using a filter means. Usually, four kinds of frequency are cyclically used for the tracking signals. In recording, video and tracking signals are recorded on the magnetic tape in superimposed fashion by the magnetic head 4 without carrying out the operation of a tracking servo. In reproducing, only the tracking signal components are extracted from the reproduced complex signal by the filter means so that it is used for a tracking servo. When the magnetic head 4 is located at the center of a track N, only the tracking signal $f_2$ is obtained as shown in FIG. 2b. If the magnetic head 4 deviates toward a track N+1, the amplitude $Pf_3$ of the tracking signal $f_3$ increases, and if the head deviates toward a track N−1, the amplitude $Pf_1$ of the tracking signal $f_1$ increases. In practice, the tracking signals $f_1$, $f_2$ and $f_3$ have respective frequencies lower than the video signal frequency. Therefore, even if a gap 401 of the magnetic head 4 is precisely located on the track N, the signals $f_1$ and $f_3$ are not nullified due to the magnetic fluxes leaking from the adjacent tracks. Accordingly, a tracking servo system is designed such that the magnetic head 4 is moved toward the track N+1 in proportion to the amplitude $PF_1$ of the reproduced signal $f_1$ and toward the track N−1 in proportion to the amplitude $PF_3$ of the reproduced signal $f_3$ so that the magnetic head 4 is urged to a position where the signals $f_1$ and $f_3$ have the same amplitude and the video signal recorded on the track N can be reproduced correctly.

In the example shown in FIGS. 2a and 2b, it is difficult to carry out the operation of tracking control during recording. For example, the recording and reproducing magnetic head 4 must operate to record a video signal and a new tracking signal $f_2$ while reproducing the tracking signals $f_1$ and $f_3$ pre-existing on the adjacent tracks. This operation is generally very difficult. An additional head may be provided for reproducing the tracking signals on two tracks opposite to any given track to carry out the operation of tracking servo by the reproduced signals. However, though a new tracking signal must be recorded on the given track for every recording operation, this fact will result in a possibility that the variation in position of the track due to the tracking servo error is accumulated with the repeated recording operations and, thereby provide a large variation in the track position. In the case of the video tape recorder, this does not pose a serious problem since a large amount of video information is continuously recorded and continuously reproduced. But, in the case of the flexible disk where a signal is frequently recorded on and reproduced from a selected track in a random access fashion, the track position needs to be set accurately.

SUMMARY OF THE INVENTION

It is an object of the present invention to provide an improved tracking servo system for a magnetic recording and reproducing apparatus using a flexible magnetic disk.

According to the present invention, a flexible magnetic disk has a plurality of tracks each of which includes a data track portion and a pair of servo track portions located on both sides of the data track portion. Tracking signals are recorded on the servo track portion pairs, respectively. When a data head means records or reproduces data on or from the data track portion in a given track, a servo head means reproduces the tracking signals recorded on the servo track portions in the opposite tracks with the given track interposed therebetween. A signal proportional to a difference in amplitude between the reproduced tracking signals is used to urge the recording and reproducing data head means to a correct position of the data track portion in the given track.

BRIEF DESCRIPTION OF THE DRAWINGS

FIG. 1a shows the pattern of servo tracks formed on a hard magnetic disk used in the conventional fixed disk unit;

FIG. 1b illustrates the amplitudes of tracking signals reproduced by the magnetic head shown in FIG. 1a;

FIG. 2a shows the pattern of signals recorded on a magnetic tape used in a known video tape recorded for home use;

FIG. 2b illustrates the amplitudes of tracking signals reproduced by the magnetic head shown in FIG. 2a;

FIG. 3 shows the pattern of data and servo track portions formed on a flexible magnetic disk according to the present invention;

FIG. 4a is a plan view of one example of a magnetic head assembly used in the present invention;

FIG. 4b is a perspective view of the magnetic head assembly shown in FIG. 4a;

DESCRIPTION OF THE PREFERRED EMBODIMENTS

Figure 5:
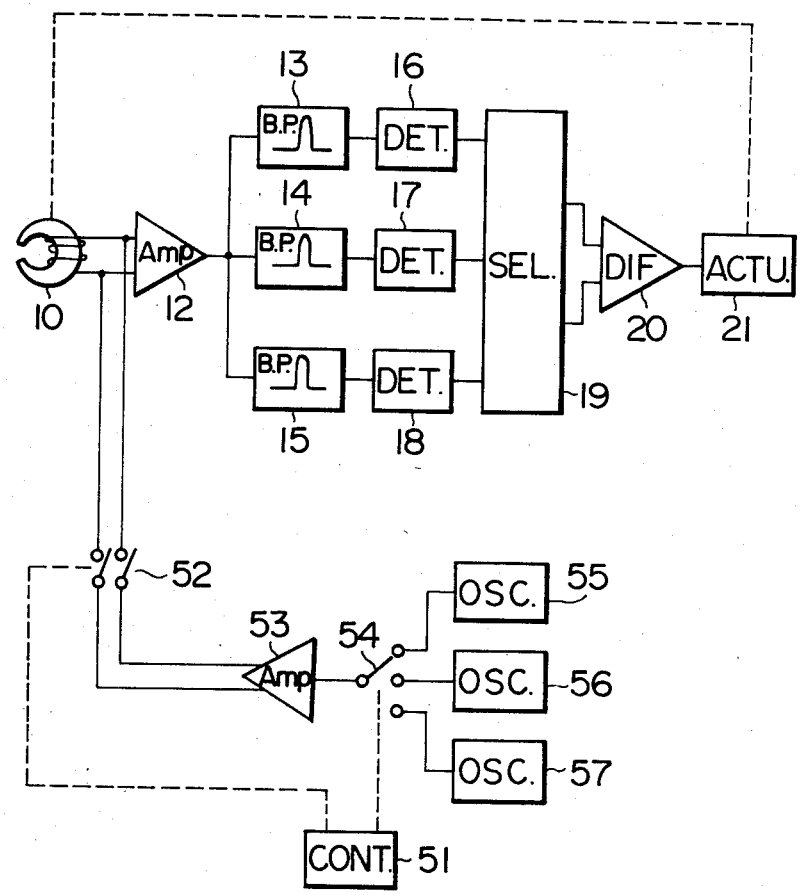
FIG. 5 is a block diagram of a tracking servo circuit or a tracking error detecting circuit used in the present invention and a circuit for recording tracking signals.

The present invention will now be described in detail by way of an embodiment with reference to FIGS. 3 to 9.

FIG. 3 shows a magnetic head assembly 8 and recording tracks 5 recorded on a recording medium of a flexible magnetic disk. Each recording track 5 includes a data track portion 6 which is located in the central portion of the track 5 and has a data signal recorded thereon, and a pair of servo track portions 7 which are located on both sides of the data track portion 6 and have tracking signals recorded thereon. As shown in FIGS. 3, 4a and 4b, the magnetic head assembly 8 includes a data head 9 and a servo head 10 formed in a unitary structure. The data head 9 has magnetic cores 902, 903 and 904 and a winding 905. A gap 901 is provided between the magnetic cores 902 and 903 for recording and reproducing data. Both end portions of the gap 901 are filled with glass material 30. The servo head 10 has magnetic cores 102, 103 and 104 and a winding 105. A gap 101 is provided between the magnetic cores 102 and 103 for reproducing tracking signals. The heads 9 and 10 are separated by a magnetic shield plate 11 interposed therebetween. Since the data and tracking signals have different frequencies, the data and servo heads 9 and 10 have different gap lengths $l_1$ and $l_2$, respectively, so as to reduce the interference of both the signals.

The tracking signals may be recorded by a special recording means in the manufacturing process of the flexible magnetic disk, or it may be recorded by the servo head 10. At least three kinds of tracking signals having different frequencies are required and are cyclically used in a predetermined order.

The gap 101 of the servo head 10 has a width $w_2$ larger than the track width or pitch T, so that even if the magnetic head assembly 8 is located at the center of a track N, the gap 101 traces a part of the servo tracks 7 on the adjacent tracks N−1 and N+1 opposite to the track N. When the magnetic head assembly 8 is tracking the track N as shown in FIG. 3, with the tracking signals on the tracks N−1, N and N+1 having different frequencies $f_1$, $f_2$ and $f_3$, the servo head 10 will provide a signal in which the reproduced amplitude of the tracking signals $f_2$ is relatively large and the reproduced amplitude of the tracking signals $f_1$ and $f_3$ are relatively small. Though the servo head 10 also reproduces the data signal on the track N, it can be eliminated by a proper filter means since the frequency of the data signal is sufficiently higher than that of the tracking signal. The position of the magnetic head assembly 8 is modified by an actuator so that the reproduced tracking signals $f_1$ and $f_3$ have the same amplitude. Thus, the magnetic head assembly 8 is urged to a correct position of the track N so that the data head 9 accurately traces the track N to correctly reproduce data recorded on the data track portion 6 in the track N or to record predetermined data on the data track portion 6. Guard bands 31 are formed between the data track portion 6 and the paired servo track portions 7 when the data is recorded on the data track portion 6.

The gap width of the servo head 10 may be equal to the track width T since even in such a case the head 10 can pick up the tracking signals $f_1$ and $f_3$.

FIG. 5 shows the block diagram of a preferred tracking servo circuit. A signal reproduced by the servo head 10 is amplified by an amplifier 12 and then passed through band-pass filters 13, 14 and 15 to extract the signal components of frequencies $f_1$, $f_2$ and $f_3$, respectively. These separated tracking signals are rectified by detectors (full-wave rectifiers) 16, 17 and 18 to produce DC signals having levels proportional to the amplitudes of the respective tracking signals. The DC signals are fed to a signal selector 19. When the magnetic head assembly 8 traces the track N, the signal selector 19 selects the DC signals from the detectors 16 and 18 corresponding to the signal frequencies $f_1$ and $f_3$ and supplies then to a differential amplifier 20 which in turn provides an output representative of a difference therebetween. An actuator 21, which may be of voice coil type, is responsive to the output of the differential amplifier 20 for urging the magnetic head assembly 8 in the transverse direction of the track N so that the magnetic head assembly 8 is positioned to the center of the track N where the reproduced tracking signals having the frequencies $f_1$ and $f_3$ have the same amplitude.

The amplifier 12, band-pass filters 13, 14 and 15, detectors 16, 17 and 18, signal selector 19, and differential amplifier 20 form a tracking error detection circuit which selects two of the three tracking signal components from the servo head 10 to produce an output signal proportional to a difference in amplitudes between the selected two signal components.

Figure 6:
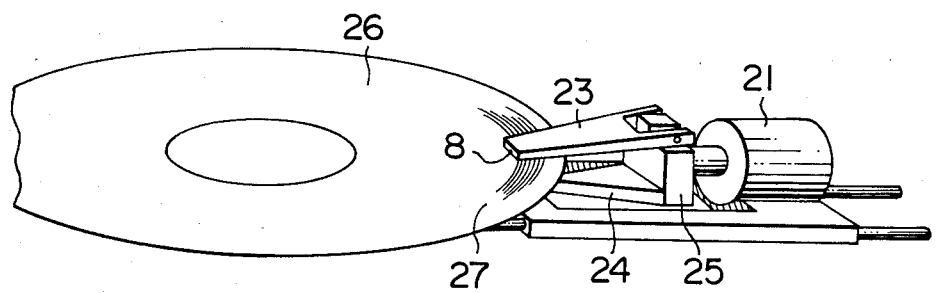
FIG. 6 is a perspective view of a tracking servo mechanism.

As shown in FIG. 6, the magnetic head assembly 8 is mounted to a head arm 23 supported by a head carriage 25 which is in turn is movable in a small range by the actuator 21 operatively associated with the head carriage 25. Since FIG. 6 illustrates the case where magnetic head assemblies are provided on the both surfaces of the disk 26, a head arm 24 is shown. The actuator 21 is also moved in the transverse direction of tracks by means of a stepping motor (not shown) so that the magnetic head assembly 8 can scan the entire area of the magnetic disk 26 in the range from the innermost track to the outermost track. Accordingly, the magnetic head assembly 8 is subjected to a relatively large movement to the position of a selected track 27 by the stepping motor and is subjected to a small movement by the actuator 21 in conjunction with the deviation of the track 27 from a correct position due to the eccentricity of the magnetic disk 26, etc. Thus, the magnetic head assembly 8 can trace or follow the selected track accurately.

When it is desired that the magnetic head assembly 8 traces the track N−1, the head is moved by one track pitch T leftwards in FIG. 3 by means of the stepping motor and the signal selector 19 selects the reproduced tracking signals from the detectors 18 and 17 having frequencies $f_3$ and $f_2$. When it is desired that the magnetic head assembly 8 traces the track N+1, it is moved rightwards and the reproduced tracking signals from the detectors 17 and 16 having frequencies $f_2$ and $f_1$ are selected by the signal selector 19. Since the tracking signals $f_1$, $f_2$ and $f_3$ are cylically recorded, the signal selector 19 selects two of the tracking signals in a corresponding predetermined order. As mentioned previously, the tracking signals may be recorded using a special recording means in the manufacturing process of the magnetic disk, or they may be recorded using the servo head 10.

Figure 7:
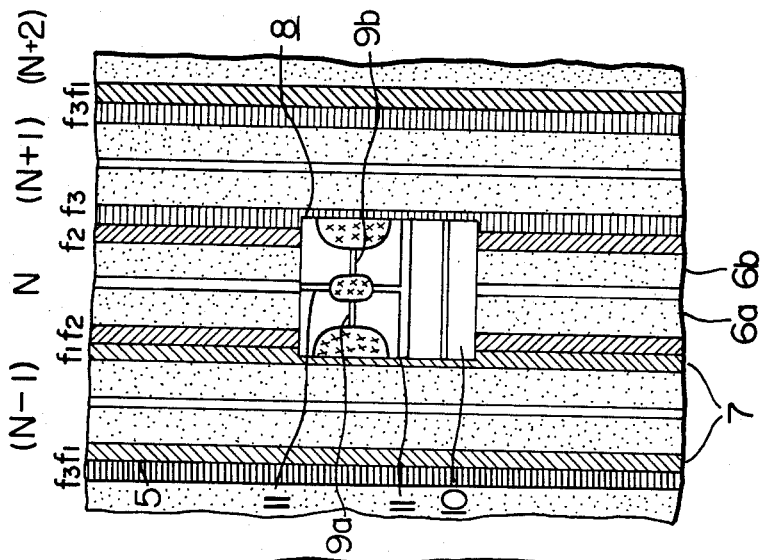
FIGS. 7 and 8 are views for explaining how the tracking signals are recorded and how data signals are recorded, respectively.

Returning to FIG. 5, a circuit for recording the tracking signals on the magnetic disk by means of the servo head 10 is shown. A controller 51 provides an output to close a double-throw switch 52. Then, the output of an oscillator 55 is fed through a switch 54, an amplifier 53 and the switch 52 to the servo head 10. The switch 54 is sequentially changed over in response to a control signal from the control circuit 51 so that the outputs of oscillators 55, 56 and 57 are selectively delivered to the servo head 10. The oscillators 55, 56 and 57 operate at frequencies of, for example, $f_1$, $f_2$ and $f_3$, respectively. Thus, each of the tracking signals having frequencies $f_1$, $f_2$ and $f_3$ is recorded over the entire track width T by means of the servo head 10, as shown in FIG. 7. In this case, the tracking signals must be recorded to cover the entire area of tracks since if an unrecorded area or an area carrying the old tracking signal remains between contiguous tracks, the normal operation of the tracking servo cannot be carried out. For this purpose, without operating the actuator 21, the stepping motor is operated to move the magnetic head assembly 8 in one direction from the innermost or outermost track in such a manner that the tracking signals are successively recorded in partly overlapped relation. The variation of the head feed amount caused by the mechanical backlash or the like is as small as about ±5 μm when the head assembly 8 is fed in one direction. For the case of a track pitch T of 127 μm, if the gap width $w_2$ of the servo head 10 is made larger than the track pitch T, i.e., 143 μm, the tracking signals $f_1$, $f_2$ and $f_3$ can be recorded on the magnetic disk uninterruptedly even under a head fabrication or working error of ±2 μm. Since the width of the thus recorded track never exceeds the gap width $w_2$ of the servo head 10 even under the worst condition and the servo head 10 always covers a part of each servo track portion in the adjacent tracks opposite to a given track which the data head 9 traces, the tracking signals recorded on the adjacent tracks can be reproduced stably for the tracking servo. Recording of the tracking signals is carried out only for a completely unrecorded disk or a disk with the previously recorded tracking signals being erased erroneously, and the servo head 10 is used solely for reproducing the tracking signals during the data recording and reproducing operations. Therefore, the position of the data track portion 6 does not vary even if the data recording operations take place frequently.

Figure 8:
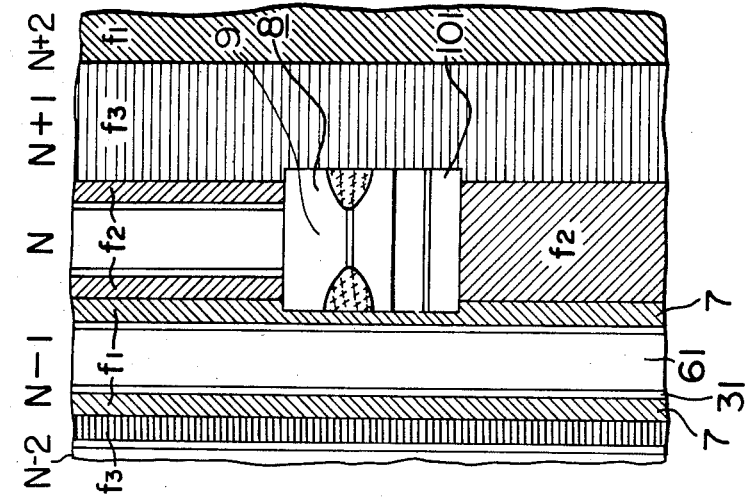

The data recording and reproducing operations are always accompanied with the operation of the tracking servo. The data track portion 6 traced by the data head 9 has a width D of about 80 μm, and each of the paired servo track portions 7 located on both sides of the data track portion has a width of about 23 μm. Since the tracking signals have lower frequencies $f_1$, $f_2$ and $f_3$ relative to the frequency of the data signal, the tracking signal which has been recorded on each data track portion 6 may be not completely erased by the data recording operation, but repetitive data recording operations will fade the tracking signal on the data track portion 6, leaving it merely on the paired servo track portions 7. The tracking control error is estimated to be around $\pm 1.5$ μm. Then, even under the consideration of the possible minimum width 117 μm of the recording track 5 and the fabrication error $\pm 2$ μm of the data head 9, the servo track portion 7 can have a width of 16.5 μm at minimum. Though the width of a track area occupied by a tracking signal varies significantly when data is recorded, the tracking servo for a given track (for example, track N) uses the tracking signals on the servo track portions 7 of the opposite tracks (for example, tracks N−1 and N+1) with the given track interposed therebetween without using the tracking signal on the given track. Therefore, even in the case where trace is made to the track N between the track N−1 on which that portion of tracking signal $f_1$ on the data track portion 61 has been overwritten by the data signal and the track N+1 on which data is not yet recorded, as shown in FIG. 8, the tracking servo can be performed normally.

In the embodiment described in connection with FIGS. 3 to 8, three tracking signals having different frequencies have been used. However, more than three tracking signals may be used provided that signal separation is possible. The tracking signals $f_1$, $f_2$ and $f_3$ may be detected by synchronous detectors based on separate reference frequency signals and the separated by respective band-pass filters.

In the embodiment shown in FIGS. 3, 4a and 4b, the magnetic head assembly 8 having the servo head with a gap width $w_2$ larger than the track pitch T has been used. However, two servo heads configured to scan only the servo track portions 7 may be provided on both sides of the magnetic head assembly. This arrangement will provide an improved S/N ratio for the tracking signals ($f_1$, $f_2$, $f_3$) since unnecessary data signal on the data track portion 6 is not reproduced. In a state before the servo system is put into its pull-in condition, for example, when a desired track is selected by the stepping motor with the magnetic head assembly floating from the magnetic disk surface and the head assembly is then lowered toward the magnetic disk surface, there may be a possibility that the head assembly is greatly deviated with the desired track. In that case, the two-servo head arrangement will require a longer pull-in time of the servo system since the two servo heads may pick up no tracking signal. The single-servo head arrangement shown in FIG. 3 having the servo head gap width $w_2$ larger than the track pitch T will result in a short pull-in time of the servo system since at least two of the tracking signals $f_1$, $f_2$ and $f_3$ can be picked up whatever position servo head 10 takes.

Figure 9:
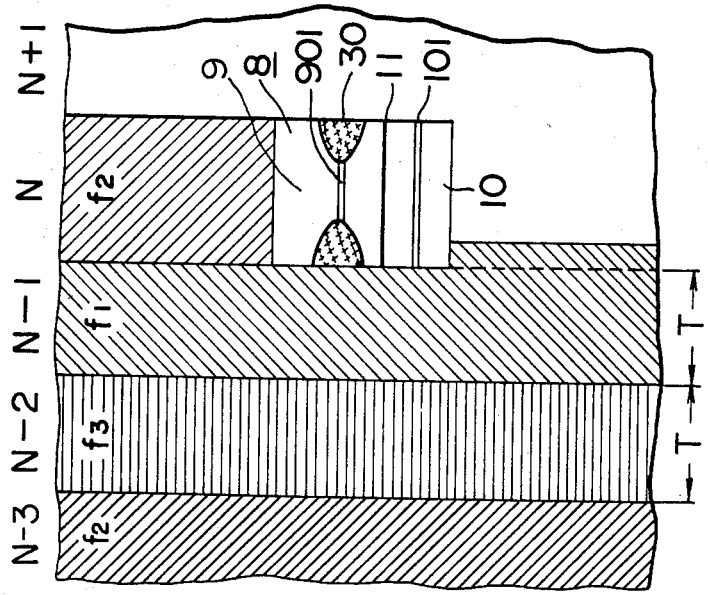
FIG. 9 shows another example of a magnetic head assembly together with the pattern of data and servo track portions formed on a flexible magnetic disk.

As shown in FIG. 9, a plurality of data heads or data head gaps 9a and 9b may be used with the data track portion being divided into a plurality of sections 6a and 6b corresponding to the gaps 9a and 9b. In this case, the same tracking servo is made to the data track sections 6a and 6b.

As described above, according to the present invention, a flexible disk unit of a simple structure can be realized in which data and tracking signals are recorded on the same magnetic disk surface. The track position does not vary even when data is rerecorded. Since the servo tracks are arranged in an area between data tracks which are to be used as a guard band in the conventional disk, the arrangement of the servo tracks does not significantly reduce the utilization efficiency of the magnetic surface.

We claim:

1. A tracking servo system for a magnetic recording and reproducing apparatus using a flexible magnetic magnetic disk, comprising:

the flexible magnetic disk having on one magnetic surface thereof a plurality of adjacent tracks, each track including a data track portion on which an information signal is to be recorded and a pair of servo track portions which are located on both sides of the data track portion and on which a tracking signal is recorded, different frequencies being respectively alloted to the tracking signals recorded on the servo track portion pairs of at least three adjacent tracks, the pair of servo track portions located on both sides of the data track portion having the same frequency;

a magnetic head assembly including a data head means and a servo head means formed in a unitary structure, said data head means being movable over said flexible magnetic disk, said data head means being provided with at least one gap for forming the data track portion in a given one of said tracks to record the information signals thereon and for reading out the recorded information signals therefrom, said servo head means being movable together with said data head means for reading out the tracking signals from said servo track portions, said servo head means being provided with a gap for reading out, when said data head means records an information signal on the data track portion in a given one of said tracks and when it reads out the recorded information signal therefrom, the tracking signals recorded on the servo track portions in the two adjacent tracks with the given track interposed therebetween, the gap of said servo head means and said said at least one gap of said data head means being arranged parallel to each other, the gap of said servo head means having a width larger than the width of the track, and said at least one gap of said data head means having a width smaller than the width of the track;

a tracking error detection circuit for receiving the tracking signals read out from said servo head means to produce an output signal proportional to a difference in amplitude therebetween; and an actuator responsive to the output signal of said tracking error detection circuit for urging said data head means to a correct position of the data track portion in said given track.

2. A tracking servo system according to claim 1, wherein said data head means is provided with a plurality of gaps in a direction of the track width.

3. A tracking servo system according to claim 2, wherein the data track portions in each of the tracks is divided into a plurality of sections corresponding to the plural gaps of said data head means, respectively.

4. A tracking servo system according to claim 1, wherein a shield plate is interposed between said servo head means and said data head means.

5. A tracking servo system according to claim 1, wherein said data head means has portions which are respectively contiguous to opposite end portions of the gap of said data head means and which are filled with glass material.

* * * * *